United States Patent
Ju et al.

(10) Patent No.: US 10,116,758 B2
(45) Date of Patent: Oct. 30, 2018

(54) DELIVERING NOTIFICATIONS BASED ON PREDICTION OF USER ACTIVITY

(71) Applicant: Facebook, Inc., Menlo Park, CA (US)

(72) Inventors: Li Ju, Issaquah, WA (US); Matthew Bryan Folz, San Francisco, CA (US); Ramanathan Palaniappan, Issaquah, WA (US); Jonathan Ma, LaSalle (CA); Pawel Bara, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 208 days.

(21) Appl. No.: 15/354,942

(22) Filed: Nov. 17, 2016

(65) Prior Publication Data

US 2018/0139294 A1    May 17, 2018

(51) Int. Cl.
*H04L 29/08* (2006.01)
*H04L 29/06* (2006.01)

(52) U.S. Cl.
CPC .............. *H04L 67/22* (2013.01); *H04L 67/02* (2013.01); *H04L 67/26* (2013.01); *H04L 67/306* (2013.01); *H04L 67/42* (2013.01)

(58) Field of Classification Search
CPC ......... H04L 67/02; H04L 67/22; H04L 67/26; H04L 67/42; H04L 67/306
See application file for complete search history.

(56) References Cited

U.S. PATENT DOCUMENTS

| | | | |
|---|---|---|---|
| 8,494,992 B1* | 7/2013 | Westbrook | G06Q 10/10 706/45 |
| 9,973,801 B1* | 5/2018 | Baryla | H04N 21/26241 |
| 2004/0128359 A1* | 7/2004 | Horvitz | G05B 19/404 709/207 |
| 2010/0046583 A1* | 2/2010 | So | H04B 1/715 375/133 |
| 2011/0004692 A1* | 1/2011 | Occhino | H04L 67/16 709/228 |
| 2011/0082807 A1* | 4/2011 | Parekh | G06Q 10/107 705/319 |
| 2012/0054627 A1* | 3/2012 | Priyadarshan | G06Q 30/02 715/738 |
| 2014/0101297 A1* | 4/2014 | Neisinger | H04L 65/4084 709/223 |
| 2016/0261915 A1* | 9/2016 | Niebres | H04N 21/4542 |
| 2016/0328481 A1* | 11/2016 | Marra | G06F 17/30867 |

* cited by examiner

*Primary Examiner* — Kostas J Katsikis
(74) *Attorney, Agent, or Firm* — Fenwick & West LLP (57) ABSTRACT

An online system predicts the user's activity on the online system during a future time interval (e.g., the next day). The system collects activity data, such as actions that the user has taken on the system. The system predicts whether the user is likely to be active during the future time interval based on features extracted from the activity data. This system determines selection of notifications and delivery of notifications based on the predicted time when the user is likely to be active on the online system. The system further records the user's past interactions with notifications, such as whether the user viewed the notification, whether the user interacted with a content item associated with the notification, and so on. If system determines a rate of delivery of notifications to the user based on the frequency of past user interactions with notifications.

17 Claims, 6 Drawing Sheets

DELIVERING NOTIFICATIONS BASED ON PREDICTION OF USER ACTIVITY

BACKGROUND

This disclosure relates generally to online systems, and more specifically to providing notifications about actions on the online system to an online system user at a time when the user is predicted to be active.

Online systems, such as social networking systems, allow users to connect and communicate with other users of the online system. Many online systems allow users to perform various actions, for example, uploading and sharing content items with other users of the online system. The online system sends notifications describing these actions to various users. For example, to increase the likelihood that other users will see and interact with content items uploaded by users, the online system sends notifications to inform other users about each new content item that has been posted. As an online system gains popularity, the number of actions performed by users via the online system increases, and the number of content items posted to the online system increases. After a certain point, providing a notification for each new action has the effect of flooding users with a large number of notifications, and this causes users to ignore the notifications altogether.

SUMMARY

An online system predicts whether a user will be active on the online system during a future time interval (e.g., the next day) and delivers notifications to the user based on the prediction. The online system increases the likelihood that the user will interact with the notifications. Furthermore, the online system reduces the likelihood of a user receiving stale items if the user connects to the online system after a period of inactivity. In an embodiment, the notifications provide information about content items posted by users in a social network group. For example, the online system selects the highest quality content items posted in the social groups and sends notifications describing these content items.

The online system collects activity data, such as actions that the user has taken on the system, and extracts features from the activity data. The extracted features include activity metrics that represent the number of days in preceding time intervals (e.g., the last day, the last seven days) during which the user was active at least once. The system makes the prediction based on the extracted features. In one embodiment, the online system provides the extracted features to a trained machine learning model. In another embodiment, the online system makes the prediction by evaluating an expression representing an aggregate value based on the features.

If the online system predicts that the user is likely to be active on the online system during the future time interval, the system selects one or more notifications from a set of candidate notifications and sends the selected notifications to the user. The system selects the notifications by scoring each candidate notification and selecting the notifications with the highest scores. This process yields notifications that the user is likely to find interesting, which thus increases the likelihood that the user will interact with the notifications. If the online system predicts that the user is not likely to be active on the online system during the future time interval, the online system does not send any notifications for that time interval.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
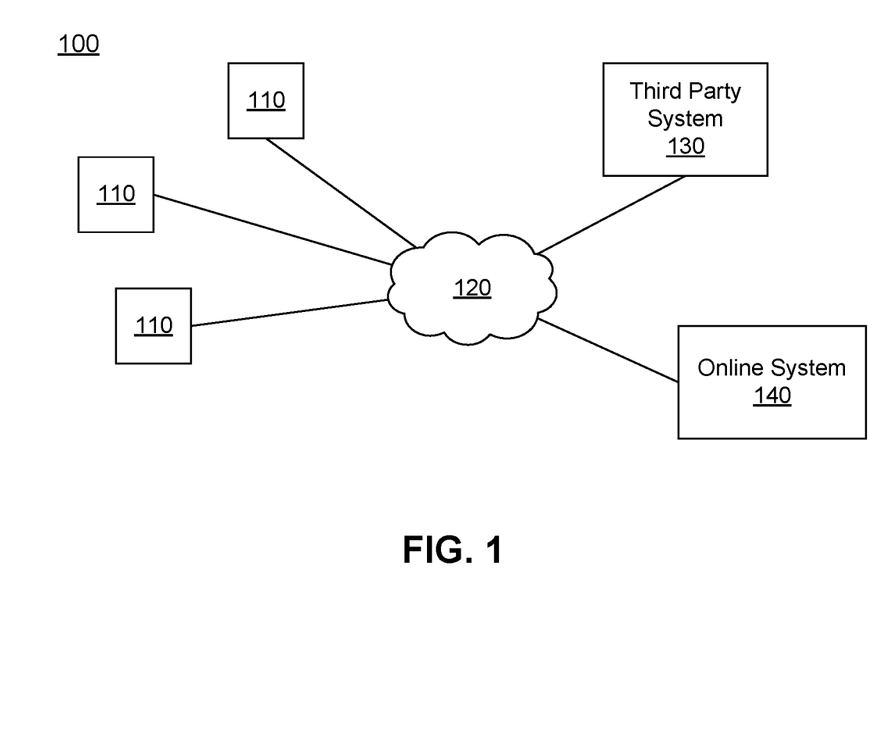
FIG. 1 is a block diagram of a system environment in which an online system operates, in accordance with an embodiment of the invention.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone, a tablet, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIGS. 2A-2B. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2A:
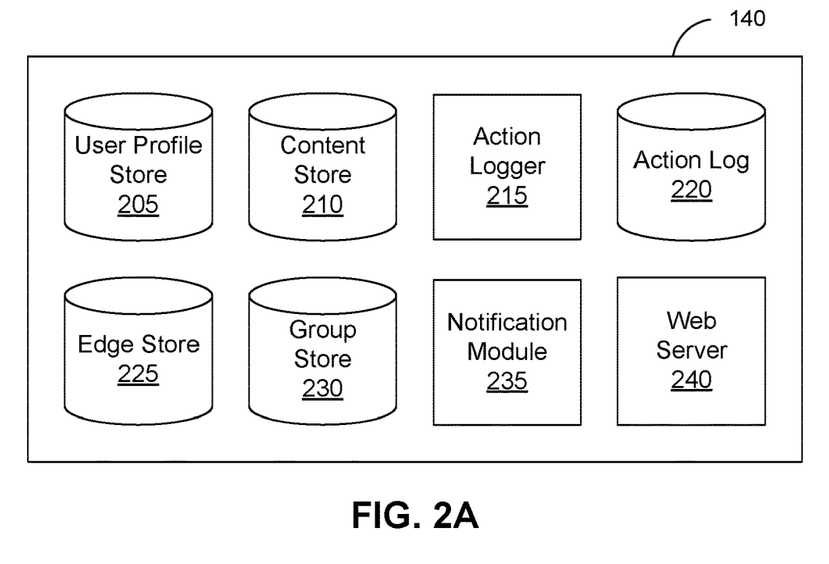
FIG. 2A is a block diagram of an online system, in accordance with an embodiment of the invention.

FIG. 2A is an example block diagram of an architecture of the online system 140. The online system 140 shown in FIG. 2A includes a user profile store 205, a content store 210, an action logger 215, an action log 220, an edge store 225, a group store 230, a notification module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, geographic location, and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups, or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 220. Examples of interactions with objects include: logging on to the online system 140, commenting on posts, sharing links, checking-in to physical locations via a mobile device, posting content items, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Users and objects within the online system can represented as nodes in a social graph that are connected by edges stored in the edge store 225.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 stores objects that each represent a group on the online system 140. Groups include one or more users and can be associated with particular subject matter. Users included in a group are referred to as "members" of the group or "group members." A user becomes included in a group after the user joins the group, and a single user can join a plurality of groups. The plurality of groups that a particular user has joined is referred to as the "user's groups," "user's associated groups," or "groups connected to the user. Groups can be "open," allowing anyone to join, or "closed," requiring a user to request to join or be invited by an existing group member to join. Thus, a user is unable to join a "closed" group until addition of the user to the group is approved, for instance by a group manager, and/or the user provides credentials (such as an email address from a particular domain, a password, or the like).

A group may have a dedicated page on the online system serving as an information hub that allows group members to communicate with each other. For example, a group page includes a wall that allows group members to post content items such as text-based messages, photos, documents, events, and links viewable by all or a subset of the group members. A content item posted to the group may then be added to the content store 210, and an edge connecting the content item to the group object may be created in the edge store 225. Alternatively, if a group member posts a content item that has already been added to the content store 210, the posting of the content item in the group merely creates an edge connecting the existing content item to the group without adding the content item to the content store 210 a second time. The group page may further allow group members to access other group features or information, such as a group calendar or other group members. In some instances, all or part of the information accessible via the group page is visible only to members of the group.

The online system 140 may allow any user to create a group. In one embodiment, a user provides information for creating a group using a specified form. Online system users may add other users to a group. Users may opt out of a group to which they are added, or may require that they approve of any group to which they are added by other users prior to being added to the group. In one embodiment, if a user opts out of a group, the social networking system prevents other users from re-adding the user to the group without pre-approval from the user.

Similar to other objects, groups are represented in the social graph by a node. A node representing a user that is a member of the group is connected to the node representing the group by an edge representing the association of the user with the group. Additional edges between a node representing a user and a node representing a group may be established to identify interactions between the user and the group. For example, the node associated with a user is connected to the node representing a group by an edge representing a communication to the group from the group members, and any number of additional edges representing other interactions between the group member and the group may be added. The group node may also be connected to a node representing the group's subject matter.

The notification module 235 provides notifications to users of the online system 140. As referred to herein, a notification is a message that informs a user of an action that has taken place on the online system 140. Notifications can be provided for actions that have taken place with respect to content items connected to the user's groups, brand pages, and other pages that can be viewed by the user. For example, a notification may inform a user that another user has uploaded, expressed a preference for ("liked"), or added a comment to a content item (e.g., an image, a link, or a text post) on one of the user's groups.

In an embodiment, the online system 140 identifies the highest quality content items and generates candidate notifications describing these content items for sending to users. The quality of a content item is determined based on various features describing the content item, for example, the types of keywords used in the content item, the quality of images in the content item, a number of user interactions with the content item, topics described in the content item, and so on.

Notifications can also be provided for actions taken on the online system 140 toward objects other than content items. For example, a notification may inform a user that a connection has been created between two other users (e.g., the two other users have become "friends") or that another user has expressed a preference (e.g., "liked") for a brand page. As noted above with respect to the action log 220, actions may include commenting on posts, sharing links, posting content items, accessing content items, commenting on a photo album, establishing a connection with an object, joining an event to a calendar, joining a group, creating an event, expressing a preference for an object ("liking" the object). Thus, the notifications provided by the notification module 235 may alert a user to these or any other kinds of actions that users perform on the online system 140. The notification module 235 is described in further detail below with reference to FIG. 2B.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or RIM®.

Figure 2B:
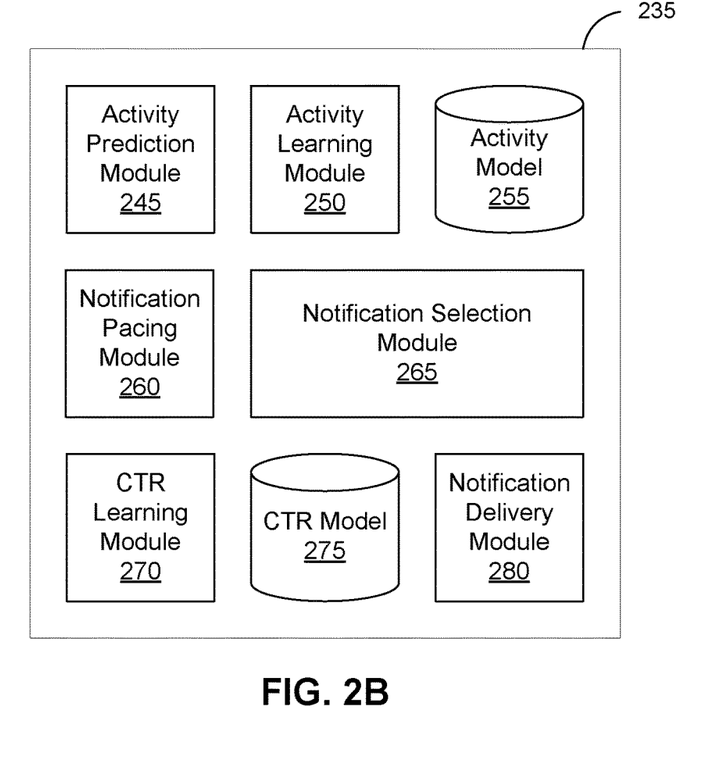
FIG. 2B is a block diagram of the notification module in the online system, in accordance an embodiment of the invention.

FIG. 2B is an example block diagram illustrating components of the notification module 235 of the online system 140. The notification module 235 shown in FIG. 2B includes an activity prediction module 245, an activity learning module 250, an activity model 255, a notification making module 260, a notification selection module 265, a click-through rate (CTR) learning module 270, a click-through rate (CTR) model 275, and a notification delivery module 280. In other embodiments, the notification module 235 may include additional, fewer, or different components for various applications, and the functionality of the notification module 235 may be distributed among its components in a different manner.

For the sake of clarity, the functionality of the notification module 235 and the processes shown in FIGS. 3A, 3B, 4A, and 4B are described below with reference to a single user of the online system 140. However, in some embodiments, the notification module 235 performs these functions for multiple users of the online system 140 or for all users of the online system 140. For instance, the notification module 235 may perform activity prediction and notification pacing for each user of the online system based on data associated with each user; similarly, the notification module 235 may train and store separate activity models 255 and CTR models 275 for each user of the online system 140.

The activity prediction module 245 receives and stores activity data about a user of the online system 140 and generates a prediction of the user's activity on the online system 140 during a future time interval. The activity data can include any data that has predictive value in determining the user's activity on the online system 140 during a future time interval. In some embodiments, the activity data includes a record of the user's actions on the online system 140 as recorded by the action logger 215 and stored in the action log 220. The activity data may also include demographic information about the user, such as the user's age, occupation, gender, and location.

After collecting the activity data, the activity prediction module 245 derives features from the activity data. In some embodiments, a feature is simply copied from a piece of activity data. For instance, each piece of demographic data, such as age, occupation, gender, and location, may be a separate feature. In other embodiments, the activity prediction module 245 extracts (or derives) features by performing some sort of transformation on one or more pieces of activity data. For example, the activity prediction module 245 may collect a user's actions over a preceding 24-hour period (e.g., the preceding calendar day) and transform the actions into a boolean value (e.g., a value of 1 if the user was active at least once during the 24-hour period and a value of 0 if the user was not active at least once during the 24-hour period). In still other embodiments, some of the features are copied from a record of activity data and other features are derived by performing a transformation on one or more records of activity data.

The activity prediction module 245 uses the features to generate a prediction of the user's activity during a future time interval (e.g., the next calendar day). A time interval as used herein refers to a contiguous period of time, for example, a day, an hour, a week, and so on. In one embodiment, the activity module 245 generates the prediction by providing the features as input to the activity model 255. In another embodiment, the module 245 generates the prediction using a process, for example, a rules-based process that assigns a fixed weight to each feature and determines a weighted aggregate value based on the features.

The prediction generated by the activity prediction module 245 is a value that quantifies the user's predicted activity during the future time interval. For example, the prediction may be a boolean value that represents whether the user will be active at least once during the future time interval (e.g., a value of 1 if the user is predicted to be active at least once during the future time interval and a value of 0 if the user is not predicted to be active during the future time interval). As another example, the prediction might be a value indicating a likelihood or probability (e.g., a scalar value between 0 and 1 or a percentage between 0% and 100%) that the user will be active at least once during the future time interval. As yet another example, the prediction might be a value indicative of a number of times the user is predicted to be active during the future time interval (e.g., a predicted number of actions that the user will perform during the future time interval).

The activity learning module 250 applies machine learning techniques to generate an activity model 255 that when applied to a future time interval outputs a prediction of whether a user will be active during the future time interval. As part of the generation of the activity model 255, the activity learning module 250 forms a training set of past time intervals by identifying a training set of past time intervals during which the user was active, and a negative training set of past time intervals during which the user was not active.

The activity learning module 250 extracts feature values from the past time intervals of the training set. As noted above with reference to the activity prediction module 245, a feature can be copied from a record of activity data, or it can be derived by performing a transformation on one or more records of activity data.

The activity learning module 250 extracts feature values from past time intervals in the same manner that the activity prediction module 245 derives features for a future time interval, but the activity learning module 250 extracts feature values using the value of activity data at the time of a past time interval. For example, if the activity prediction module 245 derives a feature for a future time interval by copying the user's current location, then the activity learning module 250 extracts a feature from a past time interval by copying the user's location at the time of the past time interval. Similarly, if the activity prediction module 245 derives a feature for a future time interval by performing a transformation on the user's actions over the preceding calendar day, then the activity learning module 250 extracts a feature from a past time interval by performing the same transformation on the user's actions over the calendar day preceding the past time interval.

An ordered list of the features for a past time interval is herein referred to as the feature vector for the past time interval. In one embodiment, the activity learning module 250 applies dimensionality reduction (e.g., linear discriminant analysis (LDA), principle component analysis (PCA), or the like) to reduce the amount of data in the feature vectors for past time intervals to a smaller, more representative set of data.

The activity learning module 250 uses supervised machine learning to train the activity model 255 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The activity model 255, when applied to the feature vector derived for a future time interval, outputs a prediction of whether the user will be active during the future time interval.

In some embodiments, a validation set is formed of additional past time intervals, other than those in the training sets, during which it has already been determined whether (and, optionally, to what degree) the user was active on the online system 140. The activity learning module 250 applies the trained activity model 255 to the past time intervals of the validation set to quantify the accuracy of the activity model 255. Common metrics include: Precision=TP/(TP+FP) and Recall=TP/(TP+FN), where TP is the number of true positives, FP is the number of false positives, and FN is the number of false negatives. Precision is how many past time intervals in the validation set the activity model correctly predicted out of the total it predicted, and recall is how many past time intervals in the validation set the activity model 255 correctly predicted out of the total number of past time intervals during which the user was actually active. A third metric is the F-score: F-score=2*(precision*recall)/(precision+recall). The F-score unifies precision and recall into a single measure. In one embodiment, the activity learning module 250 iteratively retrains the activity model 255 until the occurrence of a stopping condition, such as the accuracy measurement indication that the model 255 is sufficiently accurate (e.g., the precision, recall, or F-score exceed respective threshold values), or a number of training rounds having taken place.

The notification pacing module 260 records the user's interactions with notifications that have been sent to the user and uses the interactions to determine the number of notifications to be sent to the user during a future time interval, such as the next calendar day. The user's interactions with past notifications can include, for example, taking an action to view the notifications, viewing the content items associated with the notifications, and interacting with those content items.

In one embodiment, the notification pacing module 260 generates one or more interaction metrics based on the user's interactions with past notifications and uses the interaction metrics to generate the number of notifications to be sent to the user. A full description of the interaction metrics and how the module 250 uses them to generate the number of notifications to be sent is provided below with reference to FIGS. 4A and 4B.

The notification selection module 265 identifies a set of candidate notifications, scores the candidate notifications, and uses the scores to select a limited number of notifications to be sent to the user. In one embodiment, the module 265 identifies a candidate notification corresponding to every action that has taken place with respect to content items connected to the user's groups, brand pages, and other objects during a trailing time window (e.g., the preceding five days). The module 265 may also identify candidate notifications corresponding to actions that have taken place with respect to content items that are not connected to any of the user's groups, brand pages, or other objects during the trailing time window. For example, the module may identify a candidate notification for content items that are exceptionally popular on the social network, such as a content item posted on a brand page for well-known public figure that receives an exceptionally large amount (e.g., more than a high threshold value) of interactions from other users. The module may further identify candidate notifications for actions taken on the online system 140 toward objects other than content items, such as the creation of a connection between two other users (e.g., the two other users have become "friends"), or another user expressing a preference (e.g., "liked") for a brand page.

In one embodiment, the notification selection module 265 identifies candidate notifications for actions taken with respect to content items in "large" groups but not in "small" groups. The distinction between large groups and small groups can be defined in a variety of ways. For example, a large group can be defined as a group having a number of members exceeding a threshold (e.g., 250), and a small group can be defined a group having a number of members below the threshold. The distinction between large groups and small groups can also be based on the activity of the group. For example, a group can be classified as a large group if the number of content items posted to it over a preceding time period exceeds a threshold number, if the number of interactions that take place with content items posted in the group exceeds a threshold number, or some combination of these and other metrics. The distinction can also be based on a combination of group size (i.e., number of group members) and group activity. Similar rules can also be applied to classify other types of objects that are connected to many users and content items into "large" and "small" objects (e.g., brand pages).

In embodiments where the notification selection module classifies groups and other objects as "large" and "small," the notification delivery module 280 (described in detail below) may be configured to automatically send a notification for every content item posted in a small group (or other object), while the notification selection module 265 selects a limited number of notifications from the large groups. Selecting and sending notifications in this manner is advantageous because the user is likely to be more interested in content items posted in a small group (where the user is more likely to know the other users who are members of the group), while the scoring process for the candidate notifications, as described below, causes the notification selection module 265 to select the notifications that the user is most likely to find interesting from among a large number of candidate notifications arising from large groups.

In some embodiments, the notification selection module 265 scores the candidate notifications with a two-step process. First, the module 265 generates a base score for each candidate notification. For a candidate notification associated with both an action and a content item, the base score can be based on the number of interactions with the content item associated with the candidate notification. In one embodiment, the module 265 generates the base score by calculating a weighted sum of the number of times users have viewed the content item, expressed a preference ("liked") the content item, added a comment to the content item, and shared the content item. For a candidate notification associated with an action but not with a content item, the base score can be based on the affinity score between the user performing the action and the user receiving the selected notifications, or based on the features of the edge between the user performing the action and the user receiving the selected notifications.

Generating a base score in this manner is advantageous because it has the effect of quantifying how likely the user is to find the candidate notification interesting. For example, a user is more likely to find a notification associated with a content item interesting if many other users have already interacted with the content item (which signifies that the other users found the content item interesting). Similarly, a user is more likely to find a notification associated with an action interesting if that user had a higher affinity score with the user who performed the action.

Second, the notification selection module 265 applies a time decay to the base score to reduce the base score by an amount proportional to the amount of time that has since between the time of the associated action. In one embodiment, the time decay is linear. For example, if candidate notifications are generated for actions that took place during a five-day trailing time window, base scores for actions that took place at the beginning of the five-day trailing time window are subject to a 100% time decay, base scores for actions that took place two days into the trailing time window are subject to a 60% time decay, base scores for actions that took place three days into the trailing time window are subject to a 40% time decay actions, base scores for actions that took place at the end of the trailing time window are subject to a 0% time decay, and so on. The time decay may be alternatively configured to reduce base scores for actions that took place at the beginning of the trailing time window by less than 100%. In other embodiments, the module 265 may use a non-linear relationship when applying the time decay. For example, the module 265 may use a polynomial, exponential, or logarithmic relationship to apply the time decay.

In other embodiments, the notification selection module 265 scores the candidate notifications by generating a base score in the manner described above but does not apply a time decay to the base scores.

After generating scores for the candidate notifications, the notification selection module 265 selects one or more candidate notifications based on the scores (e.g., by selecting the one or more notifications with the highest scores). In one embodiment, the module 265 receives, from the notification pacing module 260, the number of notifications to select. In another embodiment, the notification selection module 265 selects a fixed number of notifications (e.g., 2) whenever the notification selection module 265 is invoked for selecting notifications for a user.

In an alternative embodiment, the notification selection module 265 uses the click-through rate (CTR) model 275 to perform a combined process that both determines the number of notifications to be selected and selects the notifications. In this embodiment, the notification selection module 265 derives features from each candidate notification and applies the CTR model 275 to the features to generate a predicted click-through rate (CTR) for each candidate notification. The notification selection module 265 compares each predicted CTR to a threshold CTR that the module 265 generates based on the user's interactions with past notifications. The module 265 selects one or more candidate notifications that have a predicted CTR that exceeds the threshold CTR. This process is described in more detail below with reference to the data flow diagram of FIG. 4B.

The click-through rate (CTR) learning module 270 applies machine learning techniques to generate a click-through rate (CTR) model 275 that when applied to a candidate notification outputs a predicted click-through rate (CTR) for the candidate notification. As part of the generation of the CTR model 275, the CTR learning module 270 forms a training set of past notifications by identifying a positive training set of past notifications that the user clicked through, and, in some embodiments, forms a negative training set of past notifications that the user did not click through.

The CTR learning module 270 extracts feature values from the past notifications of the training set, the features being variables deemed potentially relevant to whether or not the past notifications were clicked through. Specifically, the feature values extracted by the CTR learning module 270 include a content type (e.g., photo, link, text post) for the content item associated with the notification, the object (e.g., group, brand page, user profile) to which the content item is posted, and the user taking the action associated with the notification. An ordered list for a notification is herein referred to as the feature vector for the notification. In one embodiment, the CTR learning module 270 applies dimensionality reduction (e.g., via linear discriminant analysis (LDA), principle component analysis (PCA), or the like) to reduce the amount of data in the feature vectors for notifications to a smaller, more representative set of data.

In an embodiment, the CTR learning module 270 uses supervised machine learning to train the CTR model 275, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The CTR model 275, when applied to the feature vector extracted from a notification, outputs a predicted CTR for the notification.

In some embodiments, a validation set is formed of additional past notifications, other than those in the training sets, which have already been determined to have been (or not have been) clicked through. The CTR learning module 270 applies the trained CTR model 275 to the past notifications of the validation set to quantify the accuracy of the CTR model 275. Common metrics include: Precision=TP/(TP+FP) and Recall=TP/(TP+FN), where TP is the number of true positives, FP is the number of false positives, and FN is the number of false negatives. Precision is the number of notifications in the validation set that the activity model correctly predicted out of the total it predicted, and recall is the number of past notifications in the validation set that the CTR model 275 correctly predicted out of the total number of notifications that the user actually clicked through. A third metric is the F-score: F-score=2*(precision*recall)/(precision+recall). The F-score unifies precision and recall into a single measure. In one embodiment, the CTR learning module 270 iteratively retrains the CTR model 275 until the occurrence of a stopping condition, such as the accuracy measurement indication that the model 275 is sufficiently accurate (e.g., the precision, recall, or F-score exceed respective threshold values), or a number of training rounds having taken place.

The notification delivery module 280 receives the selected notifications from the notification selection module 265 and sends the notifications to one or more client devices 110 associated with the user. After a client device 110 receives a notification, the device 110 displays the notification to the user when the user accesses the online system 140 with the client device 110 (e.g., through a general web browser application or an application dedicated to accessing the online system 140). The client device may also be configured to display the notifications to the user as soon as the notification are received, even if the user is not accessing the online system 140 at the time the notification is received. For example, the operating system on the client device 110 might be configured to display notifications from the online system 140 on a lock screen that is displayed to the user when the device 110 is activated. As another example, a web browser application on the client device 110 might be configured to display notifications from the online system 140 in a corner of the screen whenever the web browser is active, regardless of whether the web browser is being used to access the online system 140. As still another example, the client device 110 may be configured to display the number of unviewed notifications without displaying the notifications themselves. For example, if the user has received—but has not yet read—two notifications, then the client device 110 (e.g., via a web browser application or a dedicated application) displays an icon with the number 2 superimposed over the icon. The icon represents a widget that allows users to perform interactions associated with notifications from the online system 140. The client device 110 displays the two unviewed notifications (and optionally displays other notifications that have already been viewed) when the user selects the icon.

In one embodiment, the notification delivery module 280 sends the notifications to the client devices 110 on a push basis. In other words, in this embodiment a notification originates from the online system 140 without receiving any specific requests for the notification from a client device 110 associated with the user. In another embodiment, the notification delivery module 280 sends the notifications as pull notifications, which means the notification delivery module 280 sends the notifications responsive to receiving a request from a client device 110. In still another embodiment, the notification delivery module 280 sends, on a push basis, an indication that a new notification is available, but the notification delivery module 280 does not send the notification itself. In this embodiment, an application on the client device 110 maintains a count of the number of unviewed notifications, and the application increments the count by one upon receiving an indication that a new notification is available. When the user selects the icon to view the notifications, the client device 110 pulls the notifications from the online system 140.

Delivering Notifications Based on a Prediction of User Activity

Figure 3A:
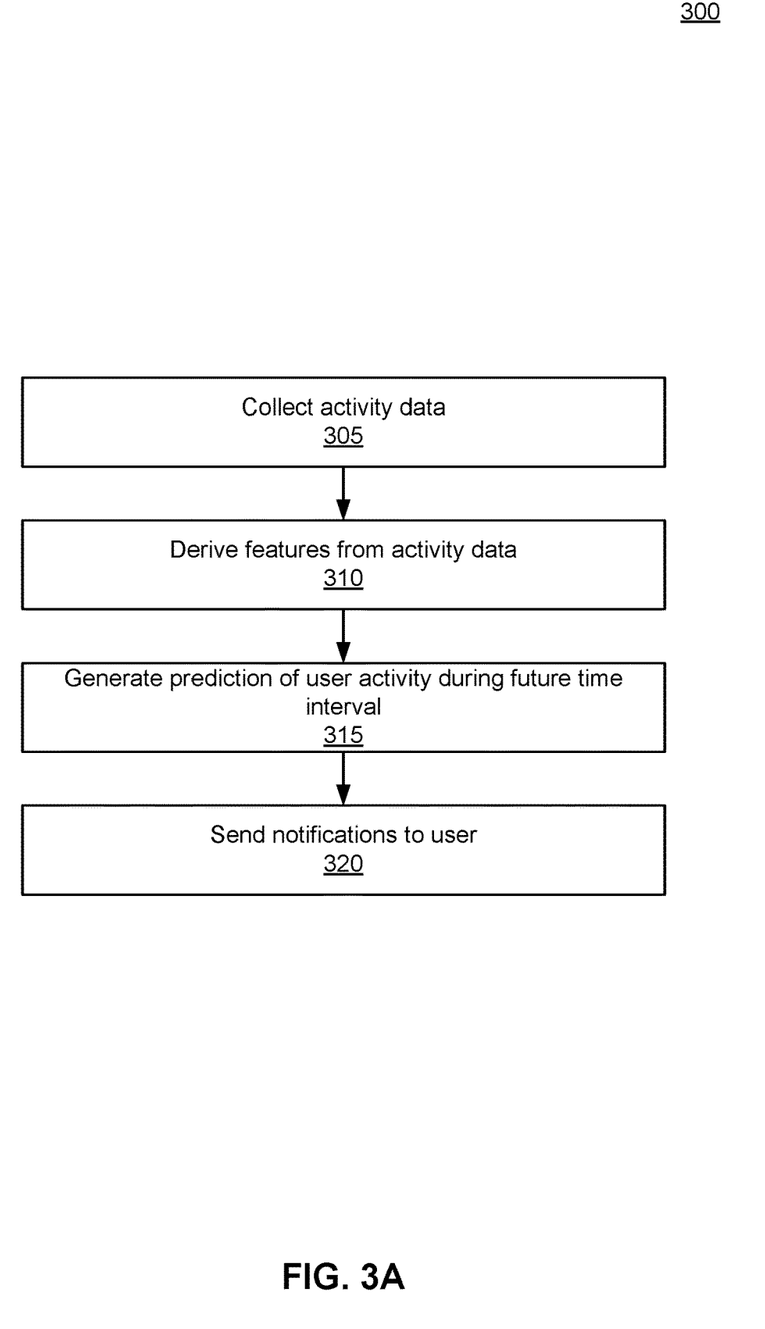
FIG. 3A is a flow chart of a method of delivering notifications based on a prediction of a user's activity, in accordance with an embodiment of the invention.
Figure 3B:
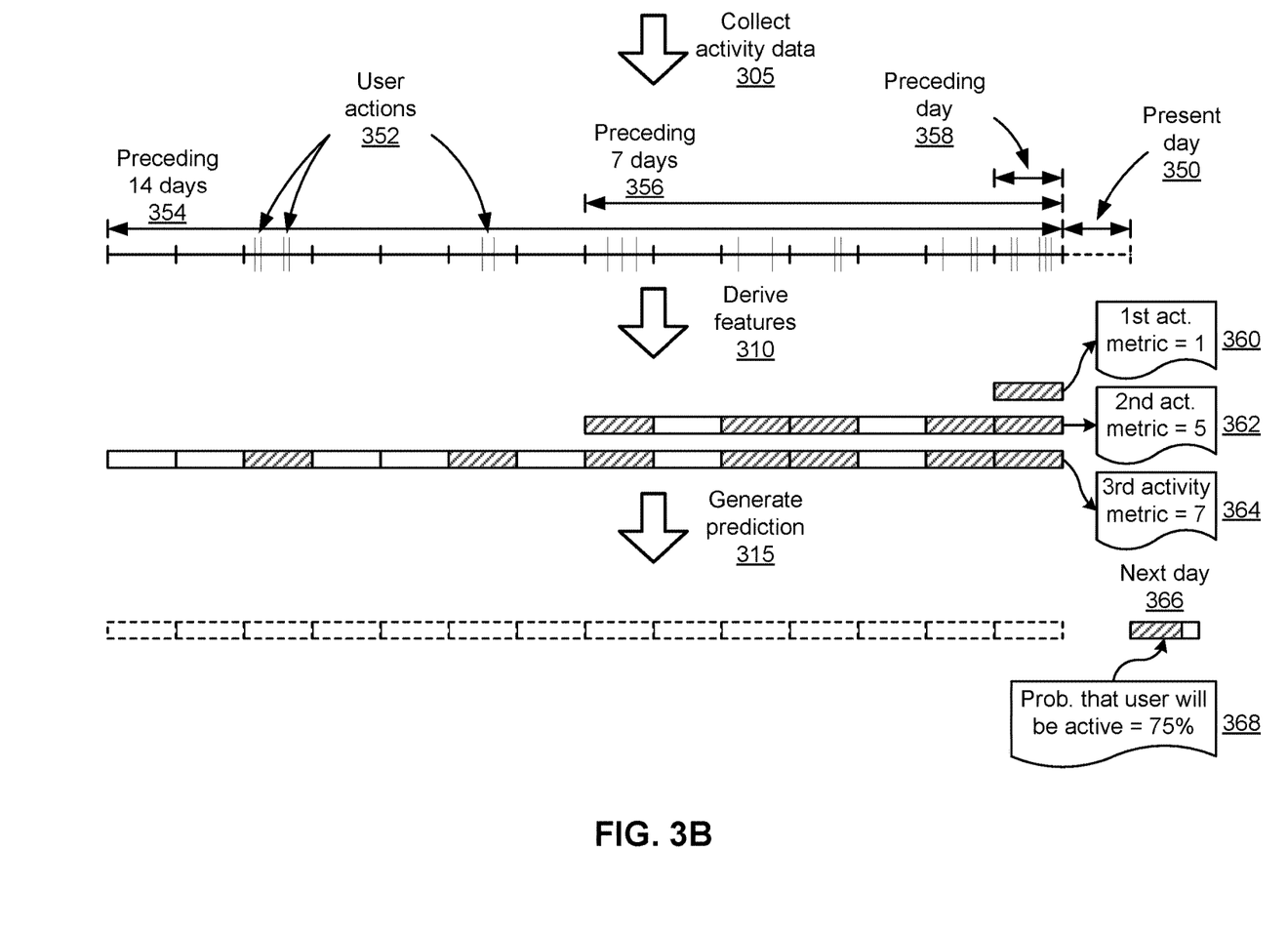
FIG. 3B is a diagram illustrating an example of using a user's past activity to generate a prediction of the user's activity in a future time interval, in accordance with an embodiment of the invention.

FIG. 3A is a flow chart of one embodiment of a method 300 for delivering notifications based on a prediction of a user's activity. In other embodiments, the method 300 may include different and/or additional steps than those shown in FIG. 3A. Additionally, steps of the method 300 may be performed in different orders than the order described in conjunction with FIG. 3A in various embodiments. FIG. 3B is a diagram illustrating an example of using a user's past activity on the online system 140 to generate a prediction of the user's activity in a future time interval. For ease of description, the method 300 shown in FIG. 3A will be described in conjunction with the diagram shown in FIG. 3B.

The online system 140 receives content items from users, for example, content items provided by users of a group. The online system 140 generates notifications based on the content items and determines whether to send a notification and when to send a notification to the user as follows. The online system 140 collects 305 activity data corresponding to the user. The online system 140 collects the activity data by receiving and storing activity data for the user. As referred to herein, activity data is any data that has some predictive value in determining the user's future activity on the online system 140. In some embodiments, activity data includes data describing actions that the user performs on the online system 140. Such data is referred to herein as user action data. In one embodiment, user action data is the data collected by the action logger 215 and stored in the action log 220, as described above with reference to FIG. 2A. In another embodiment, user action data is limited to data representing the times at which the user accessed the online system 140 (e.g., one timestamp for each time the user accessed the online system 140 through a web browser application or a standalone application on a client device 110).

In some embodiments, activity data includes demographic information about the user, such as the user's gender, location, ethnicity, languages, financial status, place of employment, and so on. Using demographic information as part of the activity data can be advantageous because demographic information can also have some value in predicting a user's future activity. For example, female users may access the online system 140 at a different frequency than male users, users located in urban areas may access the online system 140 more frequently than users located in rural areas, and users who hold white-collar office jobs may access the online system 140 more frequently than users who hold manufacturing or agricultural jobs.

Referring now to the example shown in FIG. 3B, the day on which the method 300 is operating is represented as the present day 350, and the activity data collected 305 by the online system 140 includes user actions 352 (shown in FIG. 3B as thin vertical lines) over the fourteen days 354 preceding the present day 350. For purposes of clarity, FIG. 3B also includes markers for the preceding seven days 356 and the preceding day 358 so that the three time periods associated with the activity metrics 360, 362, 364 described below are represented visually. In the example shown in FIG. 3B, there are five instances of user activity in the preceding day 350, three instances of user activity two days before the present day, no user activity three days before the present day, two instances of user activity four days before the present day, and so on.

Referring back to FIG. 3A, the activity prediction module 245 derives 310 features from the activity data. In some embodiments, the features include activity metrics. As referred to herein, activity metrics are features derived from user action data, and each activity metric is an integer value representing the number of time intervals (e.g., the number of days) during which the user was active at least once in a preceding time period. In an embodiment, the activity prediction module 245 identifies a preceding time period that is divided into one or more sub-intervals. The activity prediction module 245 determines for each of the one or more previous sub-intervals, whether the user was active during the sub-interval at least once. The activity prediction module 245 generates an activity metric representing a count of previous sub-intervals during which the user was active at least once. For example, the preceding time period may be a week and each sub-interval represents a day.

Referring again to the example in FIG. 3B, three example activity metrics are shown. In this example, the length of each time interval is one day, and the first activity metric 360 is associated with a preceding time period of one day. Thus, the first activity metric 360 represents whether the user was active at least once during the preceding day. Here, the user was active five times during the preceding day, so the first activity metric 360 has a value of 1. Similarly, the second activity metric 362 is associated with a preceding time period of seven days, so the second activity metric 362 represents the number of days in the preceding seven days during which the user was active at least once. In the example shown in FIG. 3B, the user was active during five of the preceding seven days, so the second activity metric 362 has a value of five. Finally, the third activity metric 364 is associated with a preceding time period of fourteen days, so the third activity metric 364 represents the number of days in the preceding fourteen days during which the user was active at least once. In FIG. 3B, the third activity metric 364 has a value of seven.

In the example illustrated in FIG. 3B, each activity metric 360, 362, 364 is a separate feature. However, in some embodiments, the activity prediction module 245 combines the activity metrics into a single aggregated activity metric, and the aggregated activity metric is used as a feature. Combining multiple activity metrics into an aggregated activity metric is advantageous because it can provide more predictive power than any individual activity metric. For example, a first user was active one, two, and three days ago, while a second user was active three, five, and six days ago (and was not active one, two, and four days ago). Although both users were active three times in the preceding seven days (and the second activity metric would thus have the same value for both users), the first user is more likely to be active on the following day because the first user's three days of activity occurred more recently. The fact that the first user's activity occurred more recently would be represented in the first activity metric, which would have a value of 1 for the first user and a value of 0 for the second user. Thus, in this example, combining the first and second activity metrics would provide more predictive power than using the first and second activity metrics separately.

In one embodiment, the activity prediction module 245 generates an aggregated activity metric by calculating a weighted sum of multiple activity metrics, with more weight given to activity metrics corresponding to shorter preceding time period. For example, the aggregated activity metric may be calculated from the activity metrics shown in FIG. 3B by giving high weight to the first activity metric 260 (which corresponds to a preceding time period of one day), moderate weight to the second activity metric 262 (which corresponds to a preceding time period of seven days), and low weight to the third activity metric 264 (which corresponds to a preceding time period of fourteen days).

In another embodiment, the activity prediction module 245 generates an aggregated activity metric by transforming each individual activity metric into a percentage and extrapolating a trend. For example, the first, second, and third activity metrics 260, 262, 264 shown in FIG. 3B are transformed into percentage values of 100% (1 out of 1 day), 71% (5 out of 7 days), and 50% (7 out of 14 days), respectively, and the activity prediction module 245 uses a curve fitting process to determine that these percentage values have an upward trend. A value representing the magnitude of the upward trend (e.g., if the module 245 uses a linear curve fitting process, the value is the slope of the line of best fit) is then used as the aggregated activity metric.

In embodiments where the activity data also includes demographic information about the user, the activity prediction module 245 also derives one or more features from the demographic information. In one embodiment, the activity prediction module 245 derives one feature from each piece of demographic information. For example, if the activity data includes the user's gender, location, and occupation, then the activity prediction module 245 derives a first feature from the user's gender, a second feature from the user's location, and a third feature from the user's occupation. In another embodiment, the activity prediction module 245 derives a single feature from multiple pieces of demographic information. For example, the module 245 derives one feature based on a user's occupation and location (e.g., the feature can indicate that the user is a software engineer in Seattle or an attorney in New York City).

Referring back to FIG. 3A, the activity prediction module 245 uses the features to generate 315 a prediction of the user's activity during a future time interval. In the example shown in FIG. 3B, the future time interval is the following day 366. In one embodiment, the activity prediction module 245 generates the prediction by applying the activity model 255 to the features. As discussed above with reference to FIG. 2B, the activity model 255 is a machine learning model trained by the activity learning module 250 using features extracted from activity data for past time intervals. In another embodiment, the activity prediction module 245 generates the prediction using a rules-based process (e.g., by applying predetermined weights to each feature).

In one embodiment, the prediction generated by the activity prediction module 245 may be a score represented as a scalar value. In the example shown in FIG. 3B, the prediction 268 is a measure of a likelihood or a probability that the user will be active at least once during the future time interval. As another example, the prediction may be a score representing the amount of activity the user is predicted to engage in during the future time interval. In another embodiment, the prediction is a binary value (e.g., a value of 1 if the user is predicted to be active during the future time interval and a value of 0 if the user is not predicted to be active).

If the prediction indicates that the user is likely to be active during the future time interval (e.g., if the prediction exceeds a threshold value, or if the prediction has a binary value of 1), then the notification selection module 265 selects one or more notifications for the notification delivery module 280 to send 320 to the user prior to the future time interval. A full description of how these modules 265, 280 operate to select and send notifications to a user is provided above with reference to FIG. 2B.

Figure 4A:
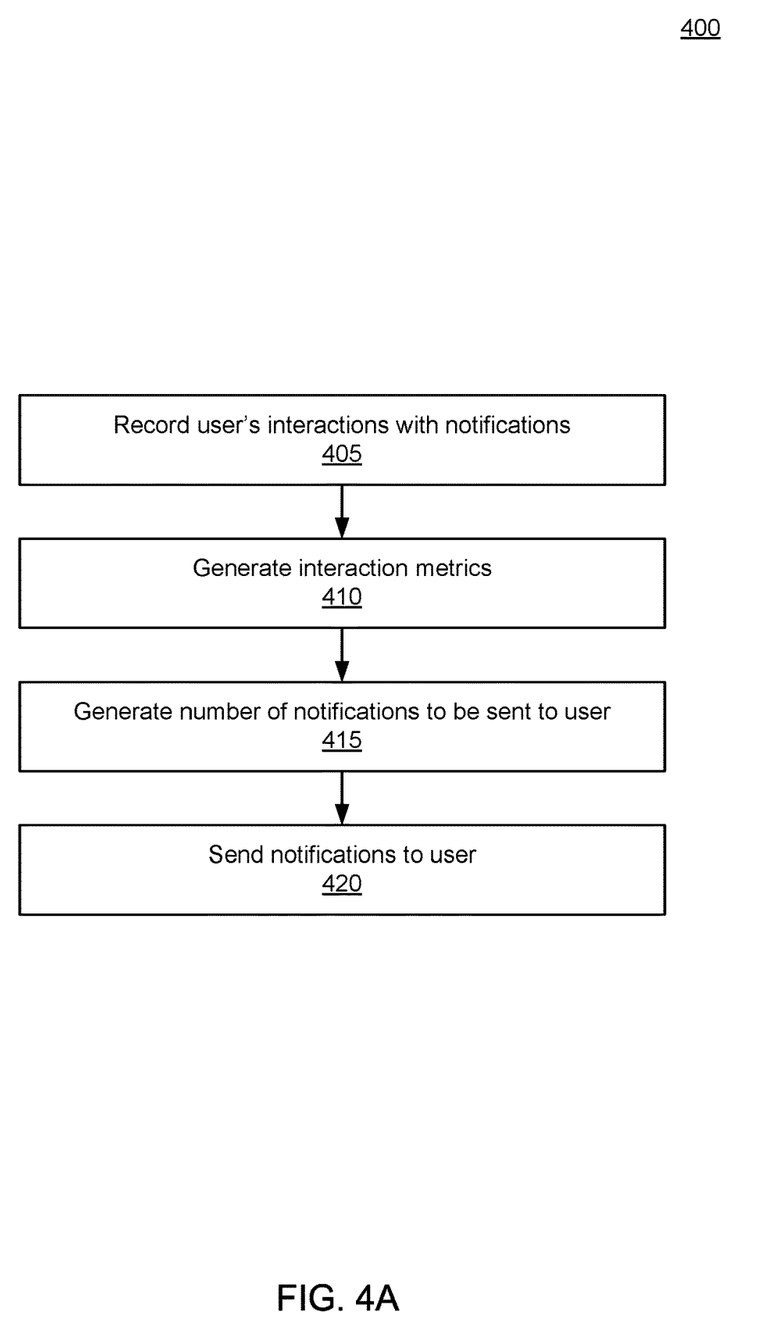
FIG. 4A is a flow chart of a method for adjusting the pacing of notifications based on a user's interactions with previous notifications, in accordance with an embodiment of the invention.

Adjusting Pacing of Notifications Based on User Interactions with Previous Notifications FIG. 4A is a flow chart of one embodiment of a method 400 for adjusting the pacing of notifications based on a user's interactions with previous notifications. In other embodiments, the method 400 may include different and/or additional steps than those shown in FIG. 4A. Additionally, steps of the method 400 may be performed in different orders than the order described in conjunction with FIG. 4A in various embodiments.

The online system 140 records 405 the user's interactions with notifications that were previously provided to the user. One possible interaction with notifications is taking an action to view the notifications. As described above, a client device 110 can be configured to display an icon with the number of notifications that the user has yet to view, and the client device 110 can further be configured to display the unviewed notifications if the user selects the icon. If a client device 110 is configured in this manner, the online system 140 records the act of selecting the icon to display the unviewed notifications as an action taken to view the notifications. Interactions with notifications can also include selecting a notification to view the action and/or content item associated with the notification, and interacting with the content item associated with the notification (e.g., by expressing a preference ("liking") it, adding a comment to it, or sharing it).

The notification pacing module 260 generates 410 interaction metrics based on the recorded interactions. Interaction metrics, as referred to herein, are metrics that quantify the degree to which the user interacted with previous notifications. For example, interaction metrics may include the percentage of notifications that a user viewed, the percentage of notifications for which the user viewed the associated action and/or content item, and the percentage of notifications for which the user performed an interaction with the associated content item. An interaction metric may also be an interaction score that combines two or more types of interactions with associated content items. For example, an interaction metric may be a weighted sum of the number of times the user viewed an associated content item, the number of times the user expressed a preference for ("liked") an associated content item, the number of times the user added a comment to an associated content item, and the number of times the user shared an associated content item.

Each interaction metric is calculated for a preceding time period, such as the preceding day, the preceding seven days, or the preceding twenty-eight days. For example, an interaction metric may be the percentage of notifications sent to the user over the preceding seven days for which the user viewed the associated content item.

The notification pacing module 260 uses the interaction metrics to generate 415 the number of notifications to send to the user prior to or during a future time interval (e.g., the following day). For example, the notification pacing module 260 generates the number of notifications to send by combining the interaction metrics with a weighted sum to generate an aggregate interaction score and then maps the aggregate interaction score to an integer number of notifications.

In some embodiments, the notification pacing module 260 enforces a hard limit on the generated number of notifications. In these embodiments, the notification pacing module 260 does not generate a number of notifications that exceeds the notification limit. For example, if the notification limit is 2, the notification pacing module 265 does not generate a number greater than 2, even if the user performs an exceptionally large number of interactions with previous notifications and causes the interaction metrics to be large enough to otherwise cause the generated number of notifications to be 3 or greater. In one embodiment, the notification limit has the same predetermined fixed (or constant) value for all users of the online system 140. In another embodiment, the notification pacing module 260 adjusts the notification limit on a user-by-user basis so that users who interact more frequently with their notifications (e.g., as measured by the interaction metrics) or who are more active on the online system (e.g., as measured by activity data collected by the activity prediction module 245) are assigned a higher notification limit.

If the notification pacing module 260 determines that at least one notification is to be sent to the user, the notification selection module 265 selects the determined number of notifications and the notification delivery module 280 sends 420 the notifications to the user either prior to or during the future time interval.

Figure 4B:
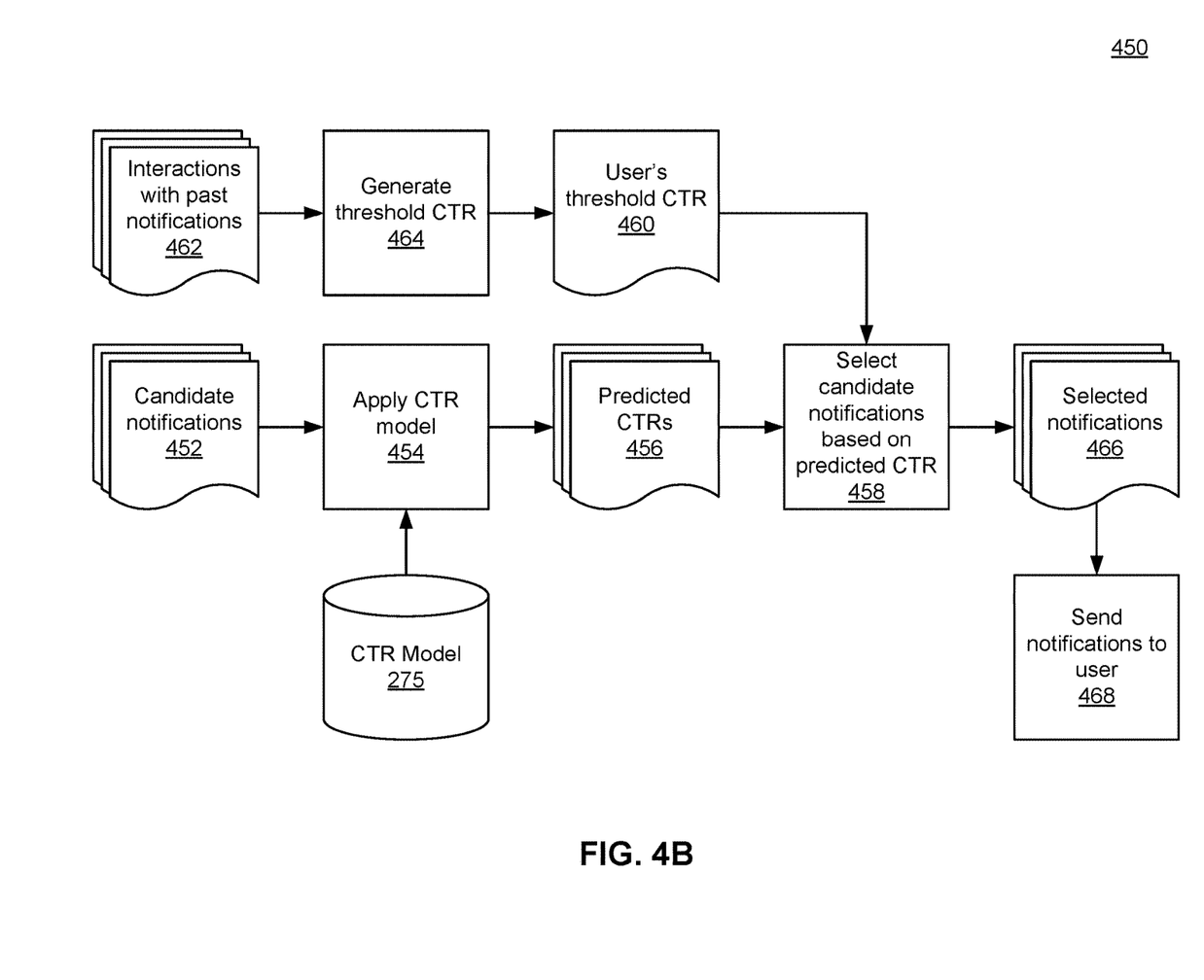
FIG. 4B is a data flow diagram illustrating a method for adjusting the pacing of notifications using a machine learning model, in accordance with an embodiment of the invention.

FIG. 4B is a data flow diagram illustrating one embodiment of a method 450 for adjusting the pacing of notifications using machine learning principles. In other embodiments, the method 450 may include different and/or additional steps than those shown in FIG. 4B. Additionally, steps of the method 450 may be performed in different orders than the order described in conjunction with FIG. 4B in various embodiments.

The notification selection module 265 generates candidate notifications 452. As described above with reference to FIG. 2B, the candidate notifications are drawn from actions that have taken place during a trailing time window, including actions that have taken place with respect to content items connected to the user's groups, brand pages, and other objects, actions that have taken place with respect to other content items, and actions taken toward objects other than content items. In addition, the notification selection module 265 module may, in some embodiments, be configured to generate candidate notifications for actions taken with respect to content items connected to "large" groups (or other kinds of objects) but not in "small" groups (or other kinds of objects).

For each candidate notification, the module 265 extracts one or more features from the notification to generate a feature vector and applies 454 the click-through rate model 270 to the feature vector to generate a predicted click-through rate 456 for the candidate notification. Features can be a value representing a content type (e.g., photo, link, text post) for the content item associated with the notification, the object or entity (e.g., group, brand page, user profile) to which the content item is posted, and the user taking the action associated with the notification (e.g., the affinity score between the user taking the action and the user receiving the notification may be used as a feature).

After generating the predicted CTR 456 for each candidate notification, the notification selection module 265 compares each predicted CTR 456 to a threshold CTR 460 associated with the user. The notification selection module 265 then selects 458 one or more candidate notifications having a predicted CTR 456 that exceeds the threshold CTR 460. In one embodiment, the notification selection module 265 selects every candidate notification 452 having a predicted CTR 456 that exceeds the threshold CTR 460. In another embodiment, the notification selection module 265 enforces a hard limit on the number of notifications it selects. In this embodiment, if the number of candidate notifications 452 with predicted CTRs 456 exceeding the threshold CTR 460 is less than or equal to the notification limit, then the notification selection module 265 selects every candidate notification 452 whose predicted CTR 456 exceeds the threshold. However, if the number of candidate notifications 452 with predicted CTRs 456 exceeding the threshold CTR 460 is greater than the notification limit, then the notification selection module 265 selects a number of notifications equal to the notification limit (e.g., by selecting the notifications with the highest predicted CTRs 456). For example, if the notification limit is two but there are five candidate notifications 452 with predicted CTR 456 exceeding the threshold CTR 460, then the module 265 may select the two candidate notifications 452 with the highest predicted CTRs 456. As described above with reference to FIG. 4A, the hard limit may have a fixed value that is applied to all users of the online system (e.g., two), or it may be dynamically adjusted on a user-by-user basis.

The notification selection module 265 generates 464 the threshold CTR 460 based on the user's interactions with past notifications 462. For example, the threshold CTR 460 may be the aggregate click-through rate across all of the user's notifications, or the aggregate click-through rate across a subset of the user's notifications (e.g., notifications about actions related to "large" groups/brand pages/user profiles but not "small" groups/brand pages/user profiles, notifications selected through the processes described herein but not notifications that are automatically delivered to the user). In addition, the threshold CTR 460 may be calculated for notifications delivered to the user during a trailing time window (e.g., the preceding month), or it may be calculated over the entire history of the user's account on the online system 140.

After the notification module 265 has selected 458 one or more notifications, the notification delivery module 280 sends 468 the selected notifications 466 to the user either prior to or during the future time interval so that they can be viewed by the user during the future time interval.

The lengths of the time intervals and time periods described above with reference to FIGS. 3A, 3B, 4A, and 4B are merely exemplary. In other embodiments, the processes described with reference to these figures may operate with time periods and time intervals of a different length. For example, instead of 1 day, the future time interval may have a length of 12 hours, 6 hours or 1 hour. Similarly, the preceding time periods may have different lengths (e.g., the preceding one day, seven days, or twenty-eight days, the preceding one day, three days, and seven days), and a different number of preceding time periods may be used (e.g., four preceding time periods corresponding to the preceding one, seven, fourteen, and twenty-eight days). Finally, in the method 300 described with reference to FIGS. 3A and 3B, the preceding time periods may be divided into time intervals having a length other than 1 day (e.g., the preceding time periods may be divided into time intervals of 12 hours, 6 hours, or 1 hour).

The method 300 described with reference to FIGS. 3A and 3B may be operated in conjunction with either of the methods 400, 450 described with reference to FIGS. 4A and 4B. In one embodiment, the method 300 for predicting a user's activity operates first, and if the method 300 determines that the user will be active during a future time interval, the online system 140 causes one of the methods 400, 450 for adjusting the pacing of notifications to operate to determine how many notifications to send prior to the same future time interval. In this embodiment, one of the notification pacing methods 400, 450 operates between the steps of generating the prediction 315 and sending 320 the notifications to the user, as shown in FIG. 3A.

Conclusion

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing, by an online system, activity data describing activity performed on the online system by a user of the online system;
receiving one or more content items from users of the online system;
identifying a future time interval associated with the user for delivery of notifications associated with the received content items;
extracting, from the activity data, features associated with the future time interval for the user, wherein extracting the features comprises:
identifying a preceding time period comprising one or more sub-intervals;
for each of the one or more sub-intervals, determining whether the user was active during the sub-interval at least once;
generating an activity metric representing a count of sub-intervals during which the user was active at least once; and
providing the extracted features as input to a model generated based on machine learning;
obtaining, as an output from the model, a score indicative of a likelihood that the user will be active on the online system at least once during the future time interval;
responsive to the score exceeding a threshold value, selecting one or more notifications, the selection comprising:
identifying a plurality of candidate notifications, each candidate notification associated with a content object;
for each of the plurality of candidate notifications generating an interaction score, the generating comprising:
determining a base score using the number of user actions performed with the content object, and
decaying the base score based on time elapsed since the content object was added to the online system; and
identifying the one or more candidate notifications based on the interaction scores;
during a delay period following the selection and prior to the future time interval, withholding a selected notification associated with a content object and monitoring whether the user has viewed the content object; and
responsive to determining that the user did not view the content object during the delay period, delivering the selected notification to the user prior to the future time interval, wherein the delivering of the selected notification is initiated at the online system.

2. The method of claim 1, wherein the preceding time period is a first preceding time period and the activity metric is a first activity metric, wherein extracting the features further comprises:
generating a second activity metric representing a number of sub-intervals during which the user was active at least once during a second preceding time period, the second preceding time period divided into a greater number of sub-intervals than the first preceding time period.

3. The method of claim 2, wherein extracting the features further comprises:
generating a third activity metric representing a number of sub-intervals during which the user was active at least once during a third preceding time period, the third preceding time period divided into a greater number of sub-intervals than the second preceding time period.

4. The method of claim 3, wherein the future time interval is the next calendar day, the sub-interval has a length of one day, the first preceding time period is the preceding day, the second preceding time period is the preceding seven days, and the third preceding time period is the preceding twenty-eight days.

5. The method of claim 1, wherein the features comprise a gender of the user and a location of the user.

6. The method of claim 1, wherein deriving the features further comprises:
combining at least the first activity metric and the second activity metric to generate an aggregate activity metric, wherein the features comprise the aggregate activity metric.

7. The method of claim 1, further comprising:
for each previous time interval of the one or more previous time intervals, each previous time interval associated with the user of the online system, determining a set of features corresponding to the previous time interval and the user, the features comprising:
the value of the activity metric at the beginning of the previous time interval; and
training the model using the sets of features associated with the one or more previous time intervals.

8. A method comprising:
storing, by an online system, activity data describing activity performed on the online system by a user of the online system;
receiving one or more content items from users of the online system;
identifying a future time interval associated with the user for delivery of notifications associated with the received content items;
extracting, from the activity data, features associated with the future time interval for the user, wherein extracting the features comprises:
identifying a preceding time period comprising one or more sub-intervals;
for each of the one or more sub-intervals, determining whether the user was active during the sub-interval at least once;
generating an activity metric representing a count of sub-intervals during which the user was active at least once;
generating, based on the features, a measure of a likelihood that the user will be active on the online system at least once during the future time interval;
responsive to the measure of the likelihood exceeding a threshold probability, selecting one or more notifications, the selection comprising:
identifying a plurality of candidate notifications, each candidate notification associated with a content object;
for each of the plurality of candidate notifications generating an interaction score, the generating comprising:
determining a base score using the number of user actions performed with the content object, and
decaying the base score based on time elapsed since the content object was added to the online system; and
identifying the one or more candidate notifications based on the interaction scores;
during a delay period following the selection and prior to the future time interval, withholding a selected notification associated with a content object and monitoring whether the user has viewed the content object; and responsive to determining that the user did not view the content object during the delay period, delivering the selected notification to the user prior to the future time interval, wherein the delivering of the selected notification is initiated at the online system.

9. The method of claim 8, wherein the features comprise a gender of the user and a location of the user.

10. The method of claim 8, wherein deriving the features further comprises:
combining at least the first activity metric and the second activity metric to generate an aggregate activity metric, wherein the features comprise the aggregate activity metric.

11. The method of claim 8, wherein the preceding time period is a first preceding time period and the activity metric is a first activity metric, wherein extracting the features further comprises:
generating a second activity metric representing a number of sub-intervals during which the user was active at least once during a second preceding time period, the second preceding time period divided into a greater number of sub-intervals than the first preceding time period.

12. The method of claim 11, wherein extracting the features further comprises:
generating a third activity metric representing a number of sub-intervals during which the user was active at least once during a third preceding time period, the third preceding time period divided into a greater number of sub-intervals than the second preceding time period.

13. A computer program product comprising a non-transitory computer-readable storage medium containing computer program code for:
storing, by an online system, activity data describing activity performed on the online system by a user of the online system;
receiving one or more content items from users of the online system;
identifying a future time interval associated with the user for delivery of notifications associated with the received content items;
extracting, from the activity data, features associated with the future time interval for the user, wherein extracting the features comprises:
identifying a preceding time period comprising one or more sub-intervals;
for each of the one or more sub-intervals, determining whether the user was active during the sub-interval at least once;
generating an activity metric representing a count of sub-intervals during which the user was active at least once;

generating, based on the features, a measure of a likelihood that the user will be active on the online system at least once during the future time interval;
responsive to the measure of the likelihood exceeding a threshold probability, selecting one or more notifications, the selection comprising:
identifying a plurality of candidate notifications, each candidate notification associated with a content object;
for each of the plurality of candidate notifications generating an interaction score, the generating comprising:
determining a base score using the number of user actions performed with the content object, and
decaying the base score based on time elapsed since the content object was added to the online system; and
identifying the one or more candidate notifications based on the interaction scores;
during a delay period following the selection and prior to the future time interval, withholding a selected notification associated with a content object and monitoring whether the user has viewed the content object; and
responsive to determining that the user did not view the content object during the delay period, delivering the selected notification to the user prior to the future time interval, wherein the delivering of the selected notification is initiated at the online system.

14. The computer program product of claim 13, wherein the preceding time period is a first preceding time period and the activity metric is a first activity metric, wherein extracting the features further comprises:
generating a second activity metric representing a number of sub-intervals during which the user was active at least once during a second preceding time period, the second preceding time period divided into a greater number of sub-intervals than the first preceding time period.

15. The computer program product of claim 14, wherein extracting the features further comprises:
generating a third activity metric representing a number of sub-intervals during which the user was active at least once during a third preceding time period, the third preceding time period divided into a greater number of sub-intervals than the second preceding time period.

16. The computer program product of claim 13, wherein the features comprise a gender of the user and a location of the user.

17. The computer program product of claim 13, wherein deriving the features further comprises:
combining at least the first activity metric and the second activity metric to generate an aggregate activity metric, wherein the features comprise the aggregate activity metric.

* * * * *